United States Patent [19]
Columbus

[11] Patent Number: 4,980,129

[45] Date of Patent: Dec. 25, 1990

[54] KIT OF COLLECTION VESSELS OF UNIFORM OUTSIDE DIMENSIONS, DIFFERENT VOLUMES

[75] Inventor: Richard L. Columbus, Rochester, N.Y.

[73] Assignee: Eastman Kodak Company, Rochester, N.Y.

[21] Appl. No.: 455,485

[22] Filed: Dec. 22, 1989

[51] Int. Cl.[5] .......................... G01N 31/22; B01L 3/00; B65D 69/00

[52] U.S. Cl. .......................................... 422/61; 422/102; 128/760; 206/571

[58] Field of Search ............... 128/760, 762, 763, 764; 422/61, 102; 206/570, 571, 572

[56] References Cited

U.S. PATENT DOCUMENTS

| | | | |
|---|---|---|---|
| 3,405,706 | 10/1968 | Cinqualbre . | |
| 3,494,351 | 2/1970 | Horn | 128/762 |
| 4,391,780 | 7/1983 | Boris | 422/102 |
| 4,472,357 | 9/1984 | Levy et al. | 422/102 |
| 4,510,119 | 4/1985 | Hevey | 422/102 |
| 4,813,426 | 3/1989 | Haber et al. | 128/763 |

FOREIGN PATENT DOCUMENTS

| | | | |
|---|---|---|---|
| 1574864 | 9/1980 | United Kingdom | 128/762 |

*Primary Examiner*—William I. Price
*Attorney, Agent, or Firm*—Dana M. Schmidt

[57] ABSTRACT

A kit of collection vessels is disclosed. Each vessel in the kit has the same overall length and outside diameter to allow interface with a single other device. However, a partition used to close off one part of the tube is positioned in some of the tubes to create volumes less than the total possible volume.

8 Claims, 1 Drawing Sheet

KIT OF COLLECTION VESSELS OF UNIFORM OUTSIDE DIMENSIONS, DIFFERENT VOLUMES

FIELD OF THE INVENTION

The invention relates to a kit of collection vessels, particularly those useful as phlebotomy tubes that cooperate with a syringe.

BACKGROUND OF THE INVENTION

In the field of phlebotomy, tubes, such as those partially evacuated for automatic blood intake, are used to receive blood from a needle. Kits of such tubes are often provided, for example, as shown in U.S. Pat. No. 3,405,706, FIG. 7. However, the tubes shown in the '706 patent all have the same volume. It is conventional to provide tubes of differing volume, since in some instances much less blood is needed, e.g., for pediatrics. For a large volume tube, the small contained blood volumes are difficult to remove after collection due to the large surface area. Prior to this invention, such tubes of differing volume have also necessitated different exterior sizes, e.g., the smaller volume tubes have also been shorter and/or narrower than the larger volume tubes.

Such difference in overall size as well as volume is advantageous in identifying (by shape) which tube is for what volume. However, it has a substantial disadvantage. In use, the tubes are inserted into a phlebotomy syringe, and in most instances the syringe is designed to receive a tube having a predetermined fixed length and diameter. For example, the phlebotomy tube shown in U.S. Pat. No. 4,813,426 snugly fits the diameter of the syringe which holds it. That syringe will not accommodate a tube of larger diameter, and only awkwardly will receive one of smaller diameter due to the sloppy fit that ensues. The sloppy fit that occurs in such a case is particularly disadvantageous when drawing blood from a child who may be very active and who may disturb the loose-fitting tube.

Hence, differently-sized collection tubes normally necessitate differently-sized syringes, which in turn leads to added expense and procedures.

Therefore, prior to this invention, there has been a need for a kit of universally sized blood collection tubes to be used in a phlebotomy syringe, that will allow differing volumes to be collected in such tubes, all with the same single phlebotomy syringe.

SUMMARY OF THE INVENTION

I have constructed a kit of phlebotomy tubes that avoids the above-noted problems.

More particularly, there is provided a kit of liquid collection vessels, all having the same overall dimensions of length, width and thickness, but of various different predetermined volumes, the vessels each comprising a container having opposite ends, at least one of which is adapted to receive a liquid, and a solid partition closing off liquid flow away from the one end of the container, the partition in some of the vessels being positioned at a location partway between the ends, selected to divide the volume of some vessels into two parts, each part being one of the predetermined volumes.

Therefore, it is an advantageous feature of the invention that devices that must interact with the vessels of the invention, such as a phlebotomy syringe, need only be a single size, since the uniform sized vessels of the kit will nevertheless accommodate different volumes.

It is a related advantageous feature of the invention that a kit of collection vessels is provided wherein all the vessels are of uniform exterior size, and approximately uniform surface/volume ratio, but each with a markedly different possible volume.

Other advantageous features will become apparent upon reference to the following Description of the Preferred Embodiments, when read in light of the attached drawings.

DESCRIPTION OF THE PREFERRED EMBODIMENTS

The invention is hereinafter described by reference to the preferred embodiments, in which the collection vessels are phlebotomy tubes for collecting whole blood. In addition, the invention is useful regardless of the liquid being collected, and, is thus not limited just to phlebotomy tubes. The invention is useful wherever there is an advantage to be gained from a universal size but different volumes, such as because the collection vessel must interface with another device that needs to be fitted to the vessel.

It is evident that certain fluid analysis programs or test schemes can require more vessels of one size than of another, and in fact, that some schemes may exclude use of certain sizes altogether. It is thus understood that "kit" means not merely a holder with an array of tube, but a supply of tubes, with or without a holder, the supply providing different sized vessels, with or without individual wraps, to allow renewal of the most used sizes, the characterization of the kit being that all its member vessels are of the same general length, width and thickness, with a common means, such as a septum, to adapt the vessel for fluid withdrawal or dispensing.

Figure 1:
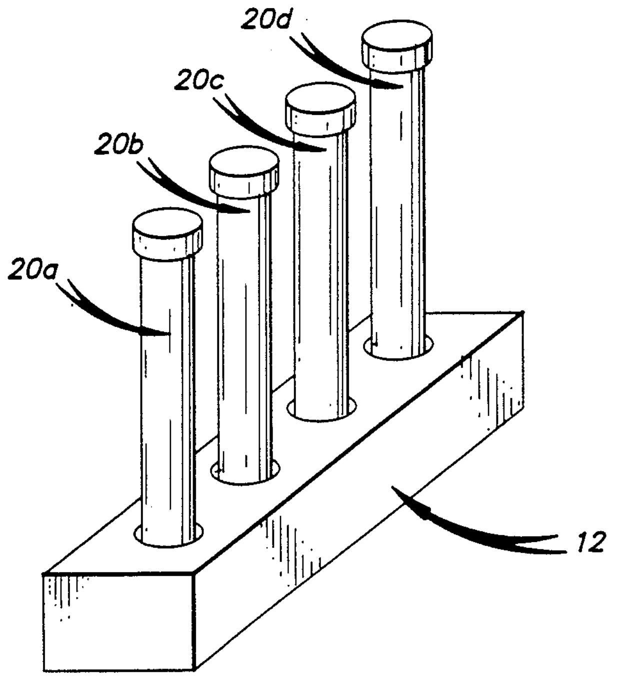
FIG. 1 is a perspective view of a kit of collection vessels prepared in accordance with the invention.

As shown in FIG. 1, kit 10 preferably comprises a suitable package that holds all of the phlebotomy tubes 20*a*, 20*b*, 20*c* and 20*d* together. In addition to the bottom holder 12 of the package that is shown, there can be a suitable top (not shown) that is hinged or removed from holder 12.

Figure 2:
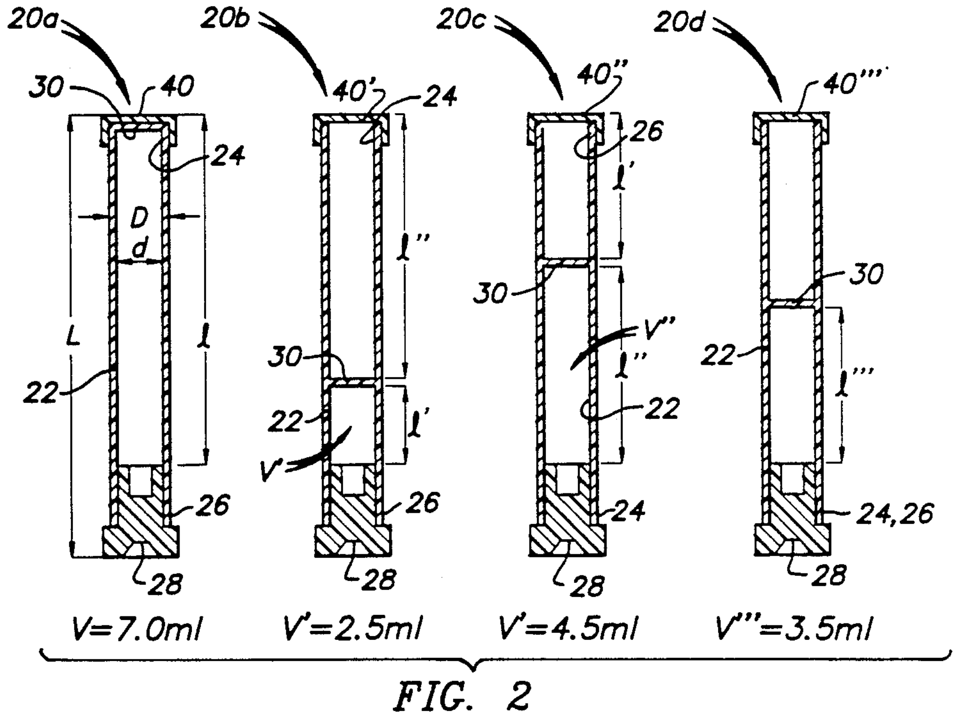
FIG. 2 is an elevational view in section of the vessels of the kit.

The basic tube is that shown as tube 20*a*, FIG. 2, which comprises preferably a cylinder that is preferably formed from a molded plastic. The cylinder has sidewalls 22, having opposite ends 24 and 26. End 26 is open, and is constructed to receive a puncturable septum 28, as is conventional. Sidewalls 22 extend for a length L with an outside diameter D.

To prevent liquid flow away from end 26 out of tube 20*a*, e.g., at opposite end 24, a solid partition 30 is formed, preferably integral with sidewalls 22. In the case of tube 20*a*, partition 30 is at the end 24, enabling tube 20*a* to collect blood over the longest possible length "l". The volume in such a case can be, e.g., 7 mL, which is usually the largest volume used in phlebotomy devices.

On the other hand, tubes 20*b*, *c* and *d* each have lesser volumes of collection, although they all use the same cylinder with the same sidewalls 22 having the same overall length L and overall diameter D. The useful volumes of these tubes (and blood collection length l' l"

and l''', respectively) are reduced by the location of the partition 30. In tube 20b, partition 30 is located so that l' and l'', as well as the useful volumes of the two parts so formed, are in a ratio of preferably 5 to 9. E.g., the volumes become about 2.5 to 4.5 mL from the original 7.0 mL volume of tube 20a. Tube 20c is substantially identical to tube 20b, except that septum 26 is in end 24 instead of end 26.

Of the ends of tubes 20b and 20c, the end that is opposite to the septum end (24 and 26, respectively) is capped with a color-coded cap 40' or 40'' that serves as a visual indicia of the volume of that tube. A similar cap 40 is used on tube 20a, being yet a different color in this instance. Alternatively, a raised number (not shown) can be formed in the cap to indicate its volume.

Tube 20d is also generally identical to the other tubes, except that partition 30 is formed half-way along the length L of sidewalls 22, leaving about half the usable volume for blood collection. Septum 28 is positioned in either end 24 or 26. Tube 20d also has its own color—or otherwise-coded cap 40''' positioned at the end opposite to the end with the septum.

Of these tubes, preferably tube 20b with volume V' is the pediatric (or geriatric) tube, as it uses the least volume of blood.

By this invention, both the volume and surface area increase generally in proportion to the increased value of useful collection length "l". Thus, when length l' is used, approximately the same surface-to-volume ratio is achieved in tube 20b as occurs in tube 20a (the constant surface area of partition 30 being small compared to the surface of $\pi d \cdot l$ (or $\pi d \cdot l'$), where d is slightly less than D). The result is, that blood in tube 20b can be poured out after collection with the same ease as in any of the other tubes 20a, 20c or 20d. It is only if the volume V' were to be collected in a tube 20a (not done with this invention), that pour-off becomes difficult, due to the larger surface area ($\pi d \cdot l$) over which the reduced volume V' is distributed.

Yet other volumes V' and V'' can be achieved to give a ratio other than 5/9, by the simple relocation of partition 30 at some other appropriate point along length L.

Any plastic can be used for cylinder 22 that will hold a vacuum for the desired storage length. The following plastics have been found to be superior for this purpose: polyethylene terephthalate, or any of the polymers described in Research Disclosure, published by Emsworth Studios, 260 West 39 Street, New York, NY 10018, Nos. 29416 and 29484, in the October, 1988 issue. More specifically, the latter include blends of poly(ethylene 2,6-naphthalenedicarboxylate) or its copolyester, with from 1 to 30 weight percent of poly(ethylene-covinyl alcohol). These blends demonstrate a low degree of gas permeability, so that the blends are unusually effective in holding partial vacuum during storage.

Alternatively, if the kit is to be used for other than evacuated containers, almost any plastic will suffice that is inert to the liquid to be collected.

Any of the tubes 20a–20d or the septum 28, or both, can be provided with flats (not shown) to prevent the tubes from rolling on a flat surface.

Additionally, any of the tubes can have added to the walls prior to use, addenda useful in handling the blood, for example, EDTA and the like.

In yet another form of the invention (not shown), a septum is included in both of the opposite ends 24 and 26 of tubes 20b, 20c or 20d, whereby both volumes can be used. The septum is then color-coded or otherwise marked for its volume V', V'' or V'''.

The invention has been described in detail with particular reference to certain preferred embodiments thereof, but it will be understood that variations and modifications can be effected within the spirit and scope of the invention.

What is claimed is:

1. A kit of liquid collection vessels, all having the same overall dimensions of length, width and thickness, but of various different predetermined volumes, the vessels each comprising a container having opposed ends, at least one of which is adapted to receive a liquid and a solid partition closing off liquid flow away from said at least one end of the container, said partition in at least one of said vessels being positioned at a location partway between said ends, selected to divide the volume of said some vessels into two parts, each part being one of said predetermined volumes.

2. A kit as defined in claim 1, wherein said parts are unequal in volume.

3. A kit as defined in claim 1, wherein each vessel bears an indicia of the volume contained therein.

4. A kit of phlebotomy tubes, all having the same overall dimensions of length, width and thickness, but of various different predetermined volumes, the tubes each comprising a container having opposed ends at least one of which is adapted to receive whole blood and having a septum therein, a solid partition closing off liquid flow away from said one end of the tube, said partition in some of said tubes being positioned at a location partway between said ends, selected to divide the volume of said some tubes into two parts, each part being one of said predetermined volumes.

5. A kit as defined in claim 4, wherein each vessel bears an indicia of the volume contained therein.

6. A kit as defined in claim 4, wherein said parts have individual volumes that form a volume ratio of about 5/9.

7. A kit as defined in claim 4 wherein said parts are unequal in volume.

8. A kit as defined in claim 4, wherein said container and said partition comprise a plastic selected from the group consisting of polyethylene terephthalate and a blend of poly(ethylene 2,6-naphthalenedicarboxylate) with from 1 to 30 weight percent of poly(ethylene-covinyl alcohol).

* * * * *

UNITED STATES PATENT AND TRADEMARK OFFICE

CERTIFICATE OF CORRECTION

PATENT NO. : 4,980,129

DATED : December 25, 1990

INVENTOR(S) : Richard L. Columbus

It is certified that error appears in the above-identified patent and that said Letters Patent is hereby corrected as shown below:

In the drawings, Fig. 2, the legend for the tube 20c should read --V" = 4.5 ml--

Signed and Sealed this

Seventh Day of July, 1992

*Attest:*

DOUGLAS B. COMER

*Attesting Officer* *Acting Commissioner of Patents and Trademarks*